Dec. 30, 1969  B. HOWLAND  3,486,825
OPTICAL TEST EQUIPMENT AND METHODS FOR MAKING AND USING SAME
Filed May 10, 1965  4 Sheets-Sheet 1

INVENTOR.
BRADFORD HOWLAND
BY Jack Larsen
ATTORNEY

INVENTOR
BRADFORD HOWLAND
BY
Jack Larsen
ATTORNEY

Dec. 30, 1969  B. HOWLAND  3,486,825
OPTICAL TEST EQUIPMENT AND METHODS FOR MAKING AND USING SAME
Filed May 10, 1965  4 Sheets-Sheet 4
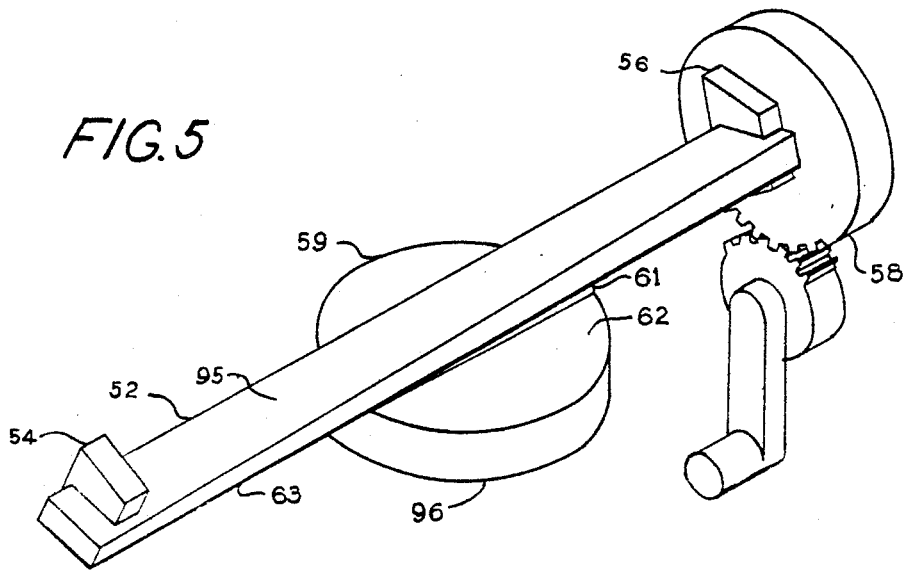
FIG. 5
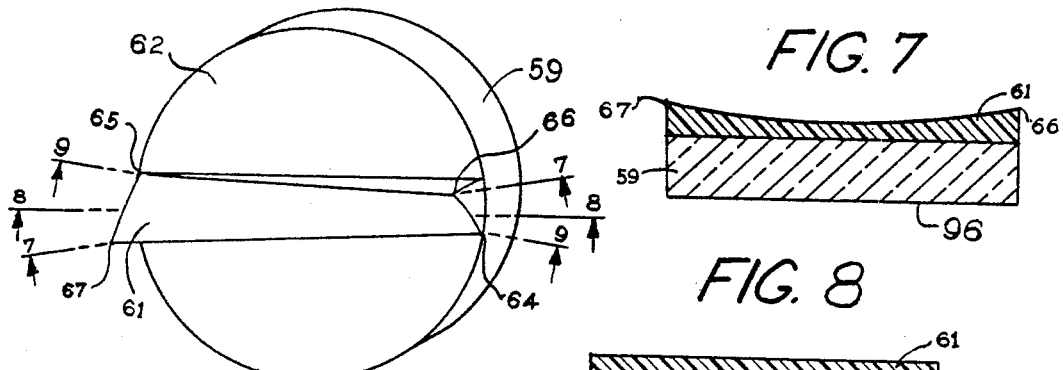
FIG. 6
FIG. 7
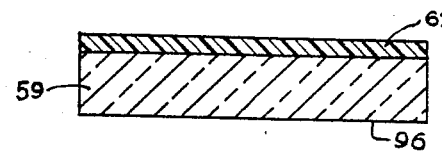
FIG. 8
FIG. 9
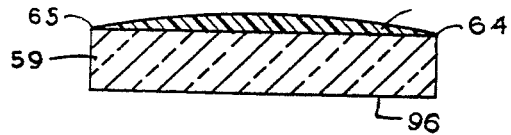
INVENTOR.
BRADFORD HOWLAND
BY Jack Larser
ATTORNEY

United States Patent Office 3,486,825
Patented Dec. 30, 1969

3,486,825
OPTICAL TEST EQUIPMENT AND METHODS FOR MAKING AND USING SAME
Bradford Howland, Cambridge, Mass.
(M.I.T. Lincoln Laboratory, Lexington, Mass. 02173)
Filed May 10, 1965, Ser. No. 454,602
Int. Cl. G01b 9/00
U.S. Cl. 356—126                            1 Claim

ABSTRACT OF THE DISCLOSURE

A method is described for testing cameras and camera lenses by utilizing the properties of the cross-cylinder lens, an ophthalmic test device. A segment of the cylinder lens is used as a supplementary lens attachment to photograph a polar coordinate chart. Analysis of the photograph permits determination of sagittal and tangential field curvatures, and also indicates errors in focal adjustment and mis-alignment of film plane with respect to the lens axis.

These tests require cylinder lenses of smaller dioptric power and quality superior to that available from the ophthalmic lens industry, methods for the construction of the needed weak, cross-cylinder lens segments are given.

---

This invention relates to photography. More particularly it relates to a simple test whereby a photographer may check on the focus and quality of his lens, and to auxiliary equipment for the test.

In recent years spectacular improvements have been made in the performance of wide-aperture photographic objectives; so that often the quality of photograph is governed more by the focussing capabilities of the associated camera mechanism than by the inherent resolution limits of the lens. Commonly used focussing means have shortcomings. The attenuated image on the group glass of the reflex camera is poorly suited for rapid and accurate focussing in dim-light situations; while with a range-finder camera, there is the possibility of mechanical inaccuracy in the mechanism.

An object of this invention is to provide a method of testing a camera system which enables a photographer to achieve more accurate focal settings than can be achieved by the trial-and-error methods of the prior art. Another object of the invention is to provide simple and inexpensive auxiliary lenses and test charts for use in the method.

A feature of the invention is the employment of a crossed-cylinder slit-lens. Another feature of the method of the invention is the making of photographs of a special test pattern through the auxiliary lens.

Other features and objectives of the invention will be apprehended from the following specification and annexed drawings of which:

FIG. 1 is a schematic representation of the arrangement for the test,

FIGS. 2a, 2b, and 2c illustrate the appearance of test photographs of the chart of FIG. 1 showing differences in focus, FIGS. 3a and 3b show results of misalignment, FIGS. 4a, 4b, and 4c show lens imperfections.

FIG. 5 illustrates an improved method of manufacturing a weak cross-cylinder slit-lens.

FIG. 6 is detail of FIG. 5 drawn to exaggerated scale, and

FIGS. 7, 8 and 9 are sections taken thru the article of FIG. 6.

Figure 1:
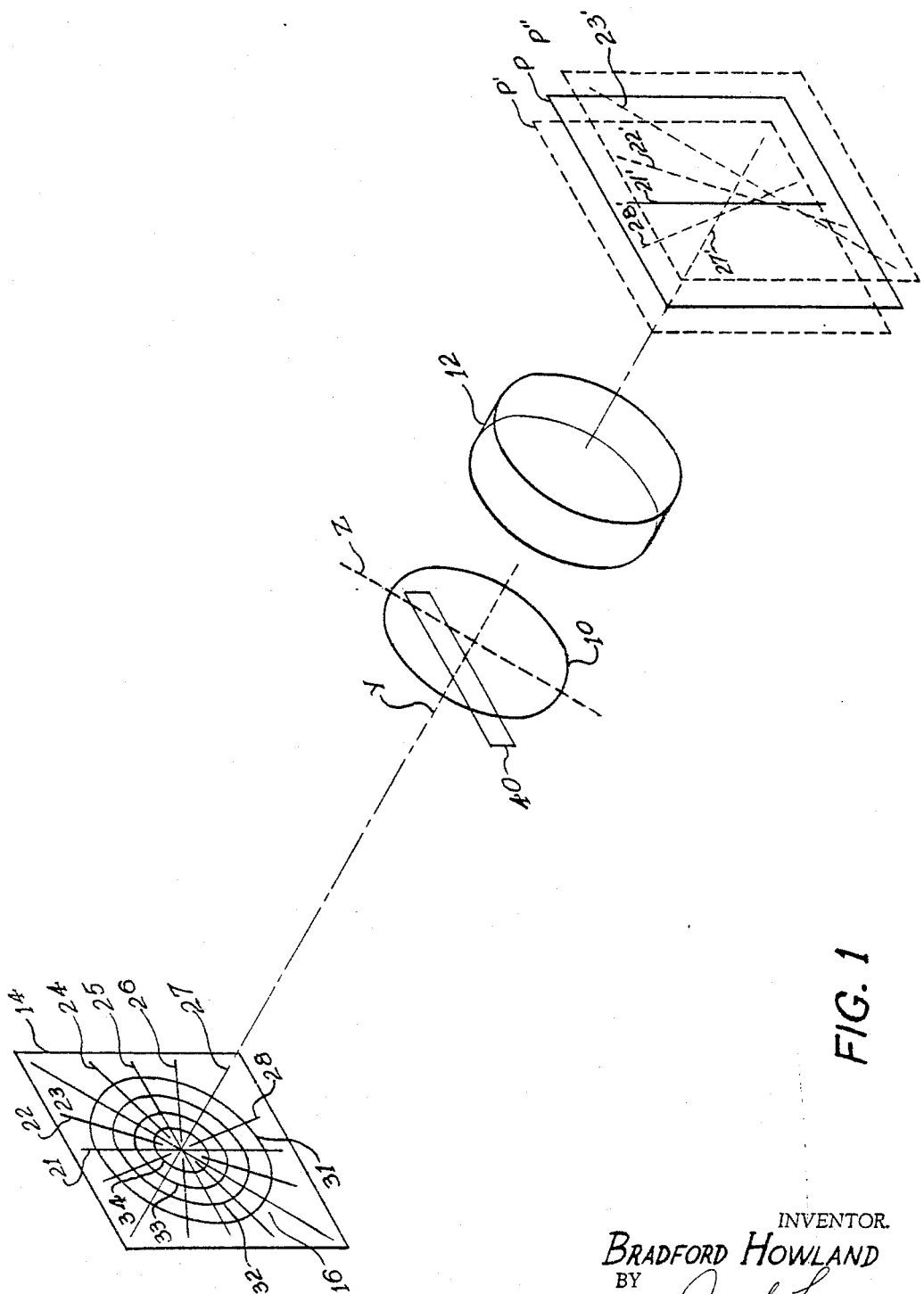

This invention makes use of the acrossed-cylinder lens, of importance in ophthalmic diagnosis. The term "crossed-cylinder lens" as used herein designates a sphero-cylinder lens having equal positive and negative refractive powers about two perpendicular axes. When such a lens is placed in front of a perfect photographic objective lens the combination exhibits a strong astigmatism. FIG. 1 represents the combination of the crossed-cylinder lens 10 in front of the normal objective 12, of a camera 13 viewing a test card 14 having a pattern 16. In the absence of the crossed-cylinder lens 10 the image of the test pattern 16 would be formed at the focal plane P of the objective 12. As arranged, the analyzer-lens 10 has its axis of positive correction Y and its axis of negative correction Z each inclined at 45° to the horizontal. Test pattern 16 comprises a number of radial straight lines (for purpose of illustration in this figure, eight in number evenly spaced) numbered 21 thru 28 respectively, and concentric circles (in this case four of them equally spaced) numbered 31 thru 34 respectively. The target line 27 is parallel to the lens axis Y. The target line 23 is parallel to the lens axis Z. With the arrangement as shown, without the slit to be described below, the placing of the auxiliary lens 10 in front of the objective 12 would completely blur the image in the normal image plane P. However, lines in the test pattern 16 which are parallel to the Y axis of the lens 10, that is the line 27 and segments of the circles 31, 32, 33 and 34 at their intersections with the line 23 would be imaged in the plane P' lying in front of the normal focal plane P by an amount determined by the positive correction of the cross-cylinder lens. Similiarly the line 23 and the segments of the circles at their intersections with the line 27 are imaged in the plane P" lying behind the normal focal plane by an amount determined by the strength of the negative correction of the auxiliary lens 10 about the negative correction axis Z. This property of the whole cross-cylinder lens lends it to its use in optometry.

The present invention departs from the prior practice by blocking off almost the whole of the cross-cylinder lens leaving only a slit along an axis midway between the Y and Z axes. The slit 40 in FIG. 1 is shown horizontal. With the slit aperture in place, the available light is greatly reduced. The image in the image plane may not be observable by means of a ground glass; but it merely requires increased exposure time for a photograph in the customary manner. Since only light passing thru the underlying small fraction of the whole surface of the crossed-cylinder lens is used in the present method it is not necessary to have a complete lens but only a sliver, as will be explained below. With the slit in place the line 27 is imaged in the plane P'; and the line 23 is imaged in the plane P", as explained above; but, in addition, the line 21' appears as the image of the line 21 in the plane P. Intermediate between the planes P and P" is formed an image 22' of the line 22; and intermediate between plane P and the plane P' is to be found the image 28' of the line 28. To avoid undue complication of FIG. 1 the radial lines in the test pattern are illustrated spaced 22½ degrees apart. In practice, it is preferred to use many more lines, for example 36 lines spaced but 5 degrees apart.

Figure 2A:
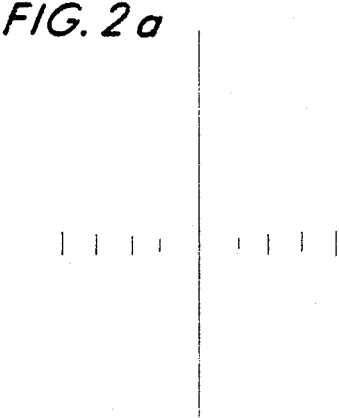
Figure 2B:
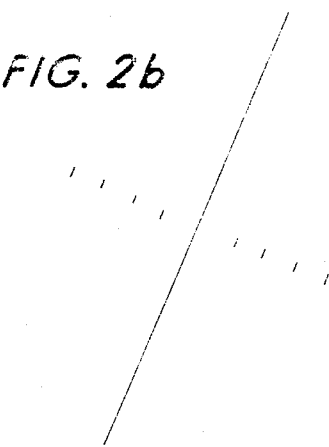
Figure 2C:
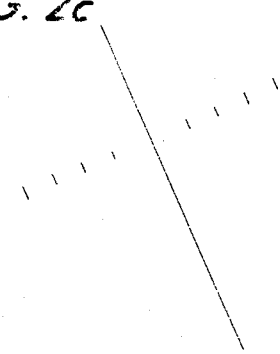

It will be apparent that taking a single photograph of a test pattern through the special analyzer lens as just described is a simple and powerful means to check the accuracy of a camera range-finder setting. With the camera diaphragm stopped wide-open and the focus determined by the range finder, a photograph is taken the film holder 41 being inserted to place a film 42 in the image plane P. Upon development of the film 42, the picture shows the error insetting. FIGS. 2a, 2b and 2c are illustrative of such photographs taken respectively at the exact focal distance and at either side of it. By this means for each setting of the range calibration of the camera a single photograph is all that is necessary to determine the error in the setting.

Figure 3A:
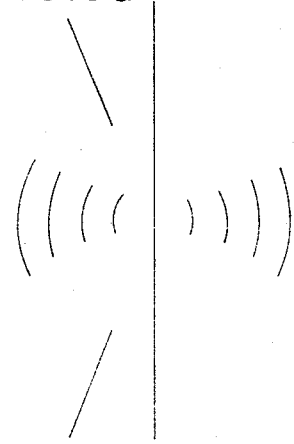
Figure 3B:
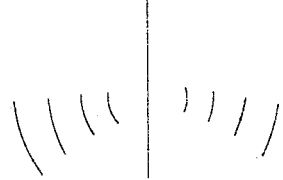
Figure 4A:
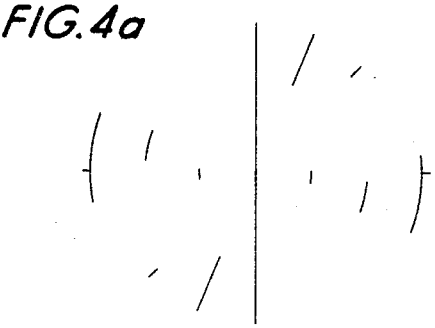
Figure 4B:
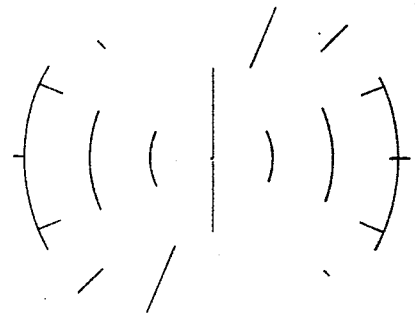

In addition to providing the careful photographer with this powerful tool with which to maintain the calibration of his cameras, the method can be used to check a camera for other defects in mechanism and lens. For example, FIG. 3a is representative of a test pattern indicating a 5-degree vertical misalignment between the axis of the lens and the normal to the film plane. FIG. 3b represents the same degree of horizontal mis-alignment of the axis of the lens with respect to the film plane. FIG. 4a is a test photograph indicating pronounced curvature of field. FIG. 4b illustrates the effect of strong curvature of the radial field only.

Figure 4C:
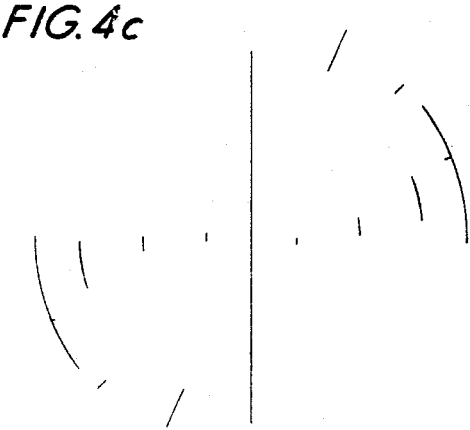

FIG. 4c represents a test photograph demonstrating astigmatism. In this pattern the radial and tangential elements of the image form tracks curved in opposite directions.

Other lens defects such as coma and spherical aberration may be detected by the method as well as the various combinations of these defects. The appearance of the resulting test photograph in each case will depend upon the relative strength of the defect in comparison with the strength of the auxiliary lens.

The more nearly perfect the lens under test, the weaker a crossed-cylinder lens required to test it. For modern camera lenses, corrections in the crossed-cylinder lens of the order plus or minus ⅛ diopter or less are required. The production of such weak analyzer lenses by the established practices in the art has been found often to result in lenses having perceptable defects.

The traditional method of making a crossed-cylinder lens is to grind one surface with a given convex cylindrical correction, say one diopter, and to grind the opposite surface with a concave spherical correction of one-half of the strength, for this example one-half diopter. The result is a crossed-cylinder lens of ±½ diopter strength.

An improved crossed-cylinder weak lens may be obtained by grinding a lens as just described having substantial corrections of about plus and minus one diopter, then imbedding the lens in a clear plastic having an appropriate index of refraction whereby both the corrections and any defects are proportionately reduced.

A preferable method for making the analyzer lenses for the invention depends on the fact that only a narrow strip of lens is used, the slit lies along the section of uniform thickness bisecting the axes of maximum positive and negative curvature this portion of the surface has the helicoidal shape of a twisted sheet.

It is, therefore, possible to form the desired lens without grinding, by twisting a rectangular rod of optical glass. FIG. 5 shows the method of fabricating the lens. A rod 52 of optical glass ground flat and square is held at one end by clamping means 54. At the other end it is retained by a clamp 56 which is twisted by a mechanism 58. To provide a substrate, against the twisted rod 52 is placed an optically clear and flat disc 59. Between the twisted rod and the flat disc is formed an irregular volume 61 bounded on the one side by the flat surface 62 of a disc and on the other side by the twisted lower surface 63 of the rod. This space 61 is filled with a suitable clear homogeneously refractive plastic material. This plastic becomes the correcting lens of the desired shape. As is shown FIG. 6, in which the plastic is drawn to exaggerated scale with the rod stripped away, the plastic element has minimum thickness at the points 64 and 65 where the rod 52 is in contact with the disc 59 maximum thickness is at the points 66 and 67. FIG. 7 is a section through the FIG. 6 taken in the plane 7—7. FIG. 8 is the section of uniform thickness taken through the plane 8—8 and FIG. 9 is a section through plane 9—9. The final lens can be made from the twisted lens assembly of FIG. 5 by a number of variations depending upon economic factors. In one variation, the plastic used between rod and the disc is an adherent clear epoxy resin which has sufficient binding strength that upon release of the clamps the rod 52 is retained in its twisted position and the combination of rod, plastic, and disc becomes the slit lens, with all but a slit along the center-line of the twisted surface being rendered opaque. As a second alternative, the glass bar may be treated with a release agent; and when the plastic body 61 is set, the glass bar 52 is stripped off, leaving the desired lens shape. By a third method the rod 52 is firmly cemented to the disc 59 in twisted form. Then, removed from the clamps, the cemented combination of rod 52, cement, and blank 59 is ground and polished, the top surface 95 of the rod being ground flat and parallel to the bottom surface 96 of the blank 59. At the completion of the grinding operation, the rod 52 is stripped from the blank and its stress is thereby relieved. The lower surface 63 of the rod is restored to flatness; but the top surface 95 permanently acquires the desired twisted helicodial shape.

The theoretical purist will immediately recognize from the boundary conditions that the volume between a helicoid and a plane cannot be the exact optical equivalent of the volume between a sphere and a cylinder, or between two cylinders. Extended far enough, the twisted bar turns full circle. Its description, therefore, requires periodic functions such as the Fourier series. In contrast, the sphere and cylinder are much simpler surfaces. Notwithstanding this fundamental difference, it has been found that for slightly twisted bars, and when using only the portion along the section of uniform thickness, the higher-order mathematical terms may be neglected. The freedom of the novel lens from artifacts and other surface irregularities more than makes up for any lack of mathematical purity.

The torsion of a rectangular beam is mathematically manageable. The theory is developed in I. S. Sokolikoff Mathematical Theory of Elasticity, McGraw-Hill Book Co., 1946, pp. 143–149 and in other standard treatises on the subject.

It will also be clear that the basic functioning of the test is not changed by the interposition of a thin spherical lens in the nature of a portrait attachment between the camera and the target. Accordingly, a plano-cylindrical lens may be used as an analyser with the slit skewed at 45 degree to the cylinder axis. This expedient introduces a bias in the range calibration which however can be accommodated. In such a case the slit does not lie along a section of uniform thickness; but it does lie in the axis which bisects the directions of principal curvature of the surface as in the other examples.

It will be understood that the above-described embodiments of the invention are by way of illustration and that other equivalants and variations will be apparent to persons skilled in the art without departing from the spirit of the invention as defined by the following claim.

What is claimed is:

1. In an optical lens testing device of the type having a polar co-ordinate test target and a surface for receiving an image of the test target through and formed by a lens being tested, a lens analyzer comprising: a lens element having a rectangular periphery and a flat surface, disposed orthogonally to a line joining said test target and its image, and a further surface, opposite to said flat surface, having a configuration which generates a cross-section which varies along a plane normal to said flat surface and coincident with one diagonal of the rectangle so as to generate a surface of negative optical power in the meridian of said one diagonal and a cross-section which varies along a plane also normal to said flat surface and coincident with another diagonal of the rectangle so as to generate a surface of positive power in the meridian of said other diagonal and a cross-section which does not vary along a plane normal to said flat surface and coincident with the long dimension of the rectangle and the bisector of the angle between said diagonals to generate a surface of zero power in the meridian of said bisector.

References Cited

UNITED STATES PATENTS

| 1,241,612 | 10/1917 | Emerson. | |
|---|---|---|---|
| 1,283,676 | 11/1918 | Conklin. | |
| 3,100,239 | 8/1963 | Courtney-Pratt | 88—56 |

RONALD L. WIBERT, Primary Examiner

T. R. MOHR, Assistant Examiner

U.S. Cl. X.R.

356—124